E. L'Hommedieu,

Making Augers,

Reissued July 30, 1845.

No. 72.

UNITED STATES PATENT OFFICE.

EZRA L'HOMMEDIEU, OF CHESTER, CONNECTICUT.

IMPROVEMENT IN MACHINERY FOR MANUFACTURING DOUBLE-TWIST SCREW-AUGERS.

Specification forming part of Letters Patent No. 851, dated July 21, 1838; Reissue No. 72, dated July 30, 1845.

*To all whom it may concern:*

Be it known that I, EZRA L'HOMMEDIEU, of Chester, in the county of Middlesex, in the State of Connecticut, did, in conjunction with RICHARD N. WATROUS, then of the same place, invent certain new and useful Improvements in the Machinery for Manufacturing Screw-Augers, and did obtain Letters Patent of the United States therefor, dated on the 24th day of July, 1838, and that I am now the sole owner of the said Letters Patent, the above-named RICHARD having assigned to me all the right, title, and interest therein; and I do hereby declare that the following is an amended description or specification of the said invention, prepared in conformity with the act of Congress in that case made and provided, I having surrendered the original Letters Patent for the purpose of correcting certain mistakes made through inadvertence, and of making the same more full, clear, and exact.

The objects of said invention are, first, to form the auger by machinery adapted to that purpose; and, secondly, to form the part called the "lip" or "lips," and also the pintle or projection in the center which is to constitute the center worm, or to form either of them, by swaging in dies duly prepared for that purpose, thereby producing the article more perfectly and expeditiously than by any process heretofore known. This latter improvement is applicable either to the double or the single twist auger with no other change in the machinery than is required by the difference in these two instruments.

Figure 1:
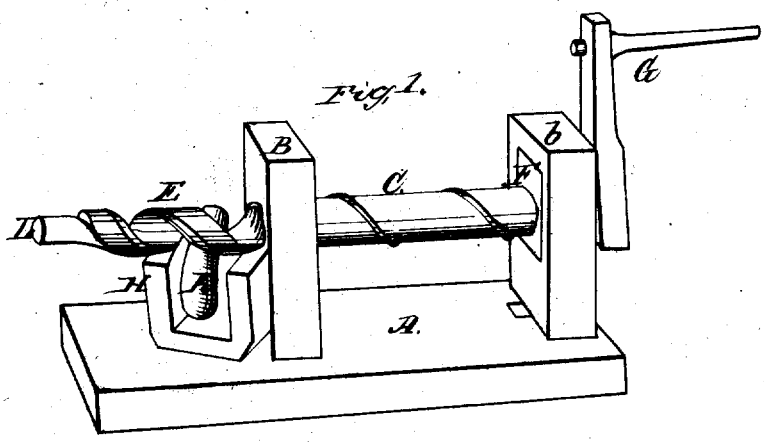

The machinery for forming the twist is represented in perspective in Figure 1 of the accompanying drawings, in which A is a strong bed or base, of iron, having two upright posts, B *b*, which should also be of iron. These posts may stand about twelve inches apart in the clear, and may rise about six inches high. Through these posts, near the top, is passed a mandrel, C, of iron or of steel. This mandrel may be about two and a half feet long and an inch and a quarter in diameter. On the front end, E, of this shaft, and extending about twelve inches from said end, a spiral cavity is made, as seen at *a*. This cavity is semicircular, or nearly so, in its cross-section, and it extends in depth a little below the axis of the shaft. Its obliquity is such as to cause it to form an angle of about forty-five degrees with the line of the shaft. The end of the shaft that moves within the front post will, when so prepared, resemble in form the blade of a single-twist auger. The part of the shaft C that works through the rear post, *b*, is furnished with a screw-thread, *c c*, standing at the same angle with the cavity *a*. This thread is received within a corresponding female screw in the box F of the rear post.

G is a winch by which the shaft C may be turned.

In front of the post B there is a stud or short post, H, so formed by means of a notch or mortise, I, as to receive a roller, K, by means of which roller and of the semicircular cavity in the shaft the twist is to be given to the auger. The post H may rise about three inches above the bed, and the roller K revolves within it and rises above its upper end. This roller may be of iron or of steel, about three inches in diameter and an inch thick. Its face is rounded, so as to adapt it to the semicircular cavity in the shaft. The stud or post H, which has two cheeks that sustain the axis of the wheel K, is so placed that the plane of the wheel shall form an angle of about forty-five degrees with the line of the shaft, which will enable it to coincide with and to enter the circular cavity *a*. The post H should be made adjustable in height, so that the periphery of the roller may always stand at a distance from the cavity equal to the thickness of the plate to be twisted.

The part of the machinery which is to form the lip or lips, and also the projection or pintle which is to constitute the center worm, are represented in Figs. 2, 3, 4, 5, and 6.

N is a stock or lower die, which may be of cast-iron, and six inches square. This at its lower end has a tenon or shank, O O, which is to be received into a bed or block, where it will be firmly held, so as to sustain the force to which it is to be subjected.

*s* is a die, which may be an inch and a half square, and which fits into a corresponding opening in the top of the stock N. This die is to be attached to an upright shaft made to rise and fall vertically, and capable of being brought down by means of a drop or hammer or otherwise with sufficient force to form the lips and pintle as required.

Through the stock or lower die, N, there is an open orifice or mortise, P, made horizontally, which may be about an inch and a half square, more or less. The bottom of this orifice should be about two inches from the bottom of the stock, in order to give access to the dies. The above-named orifice is crossed at right angles by another mortise about an inch and a half square, and passing through the stock. This mortise is to receive a horizontal bar of steel, S, that constitutes the bottom die. The bottom of this latter mortise is about an inch lower than the bottom of the orifice first mentioned, by which access is had to the swage. The bar of steel S, which may be eight inches long, more or less, is made to fit the horizontal mortise in the stock, and may be held firmly in place by keys T. At the center, on the upper side of this bar, near to its front edge, is made an excavation or cavity of the shape required to form one half of the lip or lips and of the center pintle of the head of the auger. This bar with its excavation or cavity is shown separately at S, Fig. 4. The lower end of the vertical die *s* (shown in Fig. 5) is in like manner excavated, so as to form the corresponding half of the die or swage.

Figure 6:
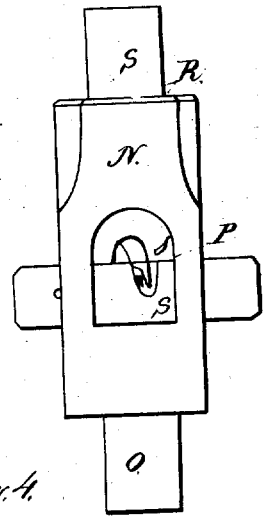
Figure 2:
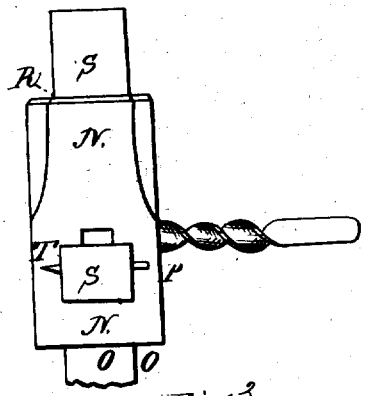
Figure 3:
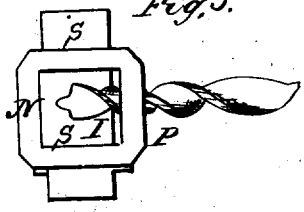
Figure 4:
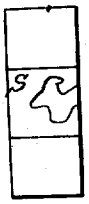
Figure 5:
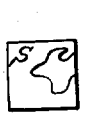

Fig. 3 is a top view of the stock N with the die S removed.

The operation of this machinery is as follows: Having, by forging in the usual manner, formed the shank and planed the blade to a suitable width and thickness, leaving sufficient stuff for forming the head, the edges of the blade should be turned up by means of a swage or otherwise, so as to form a semicircular hollow to fit the semicircular edge of the roller. The rod is then bent from the line of the shank to an angle of about forty-five degrees, or so as to adapt it to the oblique position of the roller. It is then to be heated, and the hollow of that part which is nearest to the shank placed upon the roller and under the corresponding spiral cavity of the shaft, where it is held firmly. By turning the shaft the blade thus interlocked will be twisted uniformly and drawn from the machine straightened to the line of the shank. When the operation is completed, the end which is to form the head is to be heated, placed upon the lower die, and the upper die brought down upon it with the power necessary for forming the lip or lips and the center pintle, when it will be ready for the finisher.

The size and proportions herein given are calculated for augers which bore a hole of about an inch. For those of other sizes the machinery must be varied so as to adapt it to them.

Having thus fully described the construction and operation of the machinery for manufacturing screw-augers, what is claimed therein as new, and desired to be secured by Letters Patent, is—

1. The manner herein described of arranging and combining the shaft, the roller, and their appendages, constituting the machine for twisting the common double-twist auger, as set forth, whether the same be made in the precise form described or in any other that is substantially the same, producing a like effect by like means.

2. The method of forming the lip or lips and the pintle for the center worm either on double or single twist augers by means of dies or swages combined, arranged, and operating as herein made known.

EZRA L'HOMMEDIEU.

Witnesses:
JOHN C. PALMER,
STEPHEN L'HOMMEDIEU.